T. L. BURTON.
BRAKE HEAD BALANCING DEVICE.
APPLICATION FILED JULY 27, 1916.
1,269,256.
Patented June 11, 1918.
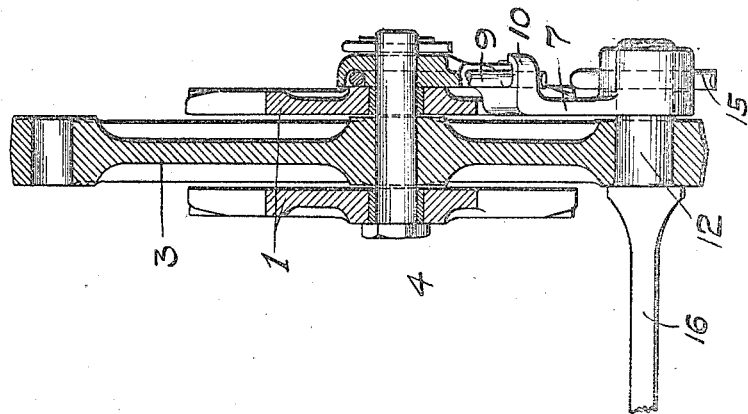
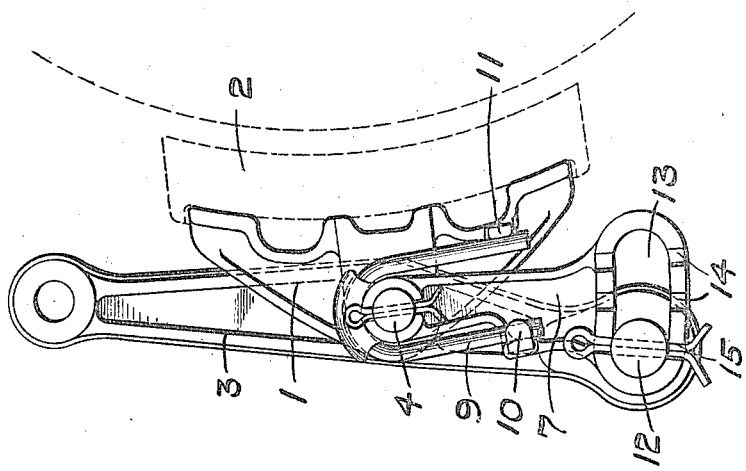
INVENTOR
Thomas L. Burton
by Edward B. Wright
Atty.

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-HEAD-BALANCING DEVICE.

1,269,256.      Specification of Letters Patent.     Patented June 11, 1918.

Application filed July 27, 1916. Serial No. 111,581.

*To all whom it may concern:*

Be it known that I, THOMAS L. BURTON, a citizen of the United States, residing at St. Louis, in the State of Missouri, have invented a certain new and useful Improvement in Brake-Head-Balancing Devices, of which improvement the following is a specification.

This invention relates to connections between brake heads and hanger levers supporting the same, whereby the brake head and shoe may be maintained in a position substantially concentric with the wheel in both the release position and in the applied position, and may also be adjusted to maintain the same relative positions when the shoe and wheel become worn.

It is important that the brake head should be pivoted upon the hanger lever with the capacity of a relative movement sufficient to compensate for the swinging movement of the hanger lever in the ordinary application and release action of the brake, and thereby maintain the brake shoes substantially concentric with the wheel in both positions. Such a construction is fully covered in my prior Patent #1,199,872, issued October 3, 1916. Said prior patent also includes frictional means for automatically adjusting the device to compensate for the wear of brake shoes and wheels.

According to my present improvement, I provide a manual adjustment which may be readily made for compensating for the wear of the shoes and wheels, and to maintain the brake shoes substantially concentric with the wheel at all times.

In the accompanying drawings: Figure 1 is a side elevation; and Fig. 2, a vertical transverse section of one form of brake head connections embodying my improvement.

As shown, the brake head, 1, carrying the brake shoe, 2, is pivotally mounted on the hanger, 3, by means of the bolt or pin, 4, passing through the two flanges of the brake head. An arm, 7, is pivotally mounted, preferably on the bolt, 4. A spring, 9, is employed between said arm and the brake head, said spring being preferably of an inverted U shape, extending around the bolt, 4, and having one end engaging the lug, 10, on the arm, 7, while the other end engages the lug, 11, on the brake head, this construction being similar to that shown in my prior application above referred to.

According to my present improvement, the arm, 7, is normally held in a fixed relation to the hanger lever, 3, by any suitable connection which may be manually adjusted from time to time to compensate for the wear of the brake shoe and wheel. As shown in the drawing, this connection is made by providing the lower end of the arm, 7, with a curved slot, 13, through which the end, 12, of the brake beam, 16, may extend and be fastened thereto by a cotter, 15, which may be inserted through any one of a plurality of holes, 14, for adjusting the relation between the brake head and hanger lever, the brake beam being rigidly supported at the lower end of the hanger lever.

When the shoe is released from the wheel, the spring holds the same substantially concentric with the wheel, as indicated in Fig. 1, and also provides for a limited yielding movement to allow the brake head to turn slightly on its pivot when the shoe is applied to the wheel, and thereby maintain its concentric relation in both the applied and release positions. As the shoe and wheel become worn, requiring the hanger to swing through a longer arc in the application and release movement, the arm, 7, may be adjusted by setting up the cotter pin, 15, to the next set of holes, 14, and thus shift the end of the spring to compensate for the wear. This adjustment may be repeated as often as necessary, and the shoe thus retained in a substantially concentric relation to the wheel at all times until the shoe is practically worn out. When a new shoe is inserted, the cotter pin may be shifted back to the first position.

Having now described my invention, what I claim as new and desire to secure by Letters Patent is:

1. The combination of a brake hanger, a brake head pivotally connected thereto, a spring acting between the brake head and hanger, and manually operable means movably mounted relative to the hanger for adjusting the position of one end of the spring.

2. The combination of a brake hanger, a brake head pivotally connected thereto, a spring bearing at one end against the brake head, the other end being adjustable relative to the hanger, and manually operable means for adjusting the latter end of the spring.

3. The combination of a brake hanger, a brake head pivotally connected thereto, a spring bearing at one end against the brake head, an arm pivotally mounted on the hanger for supporting the other end of the spring, and manually operable means for adjusting the position of the arm.

4. The combination of a brake hanger, a brake head pivotally connected thereto, a spring bearing at one end against the brake head, an arm mounted on the brake head pivot and having a lug for supporting the other end of the spring, and manually operable means for adjusting the position of said arm.

5. The combination of a brake hanger, a brake head pivotally connected thereto, a spring bearing at one end against the brake head, an arm pivotally mounted on the hanger for supporting the other end of the spring, a brake beam attached to said hanger, and adjustable connecting means between said arm and the end of the brake beam.

In testimony whereof I have hereunto set my hand.

THOMAS L. BURTON.